Aug. 20, 1935.  J. M. TEAHEN  2,011,782
FLUSHING VALVE FOR WATER CLOSETS
Filed Dec. 5, 1932
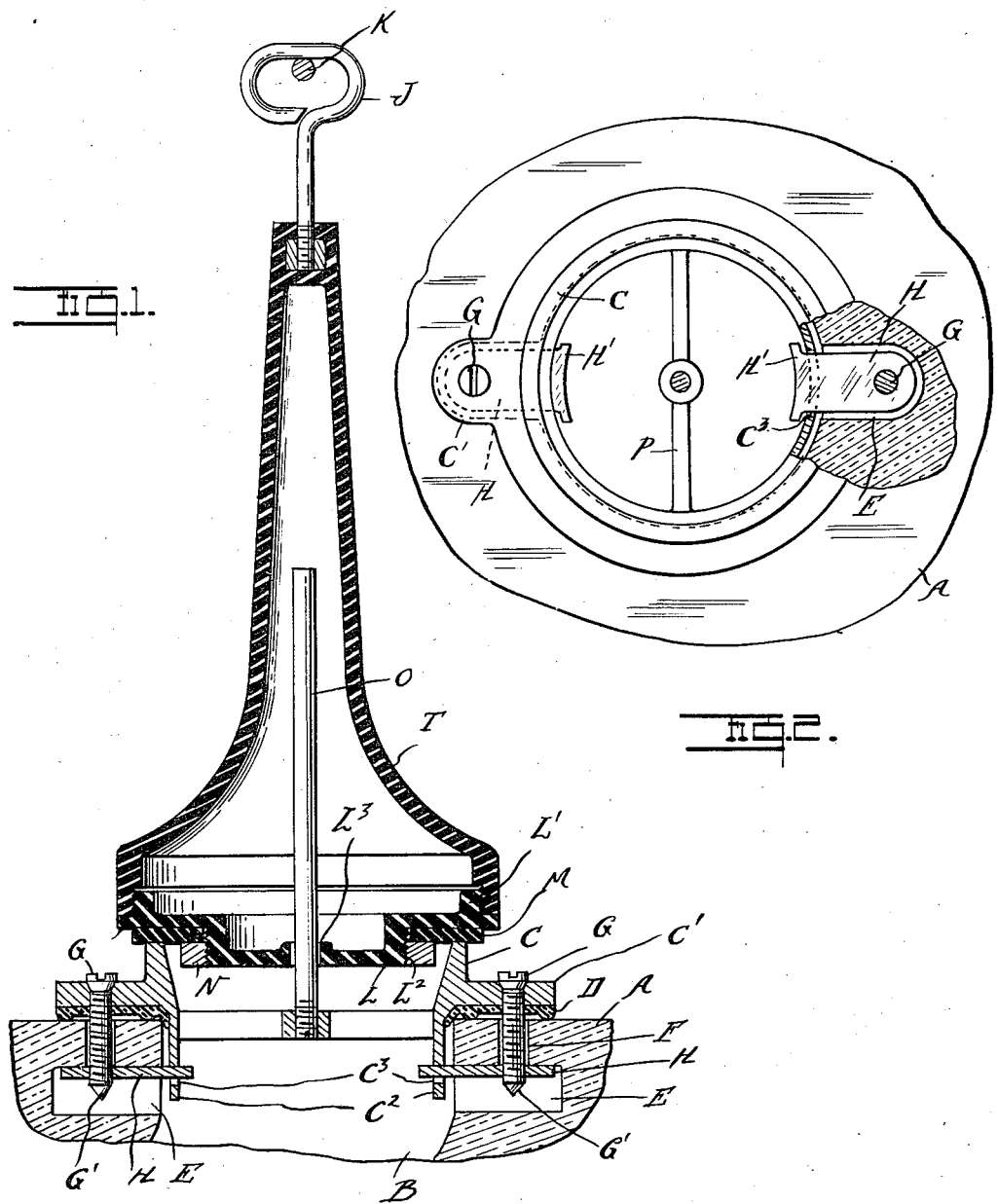
Inventor
James M. Teahen Patented Aug. 20, 1935

2,011,782

UNITED STATES PATENT OFFICE 2,011,782

FLUSHING VALVE FOR WATER CLOSETS

James M. Teahen, Detroit, Mich.

Application December 5, 1932, Serial No. 645,855

4 Claims. (Cl. 4—56)

The invention relates to flushing valves for water closets and more particularly to that type in which the float valve is positively connected to the manual operating means therefor. With such constructions the seating of the valve returns the operating means to normal position and in case of any failure to automatically seat, it may be manually actuated towards its seat. It is the object of the invention to overcome certain defects in constructions now in use and to minimize failures in operation. Also to obtain a construction which is inexpensive to manufacture and which can be easily installed. With these objects in view the invention consists in the construction as hereinafter set forth.

In the drawing:

Fig. 1 is a vertical central section through the flush valve and its seat;

Fig. 2 is a plan view of the seat.

My improved valve is applicable to various types of flushing tanks but is particularly adapted for use with that type of water closet where the tank, bowl and connecting passages therebetween are all formed of an integral construction. With such closets the height of water in the tank is usually less than is the case with wall tanks and because of the comparatively low head and the connecting passage between the tank and the bowl is comparatively large in cross section. In securing the seat for the valve in the tank it is desirable to avoid perforation of the walls for the passage of securing screws, as this both disfigures the fitting and endangers leakage. With my improved construction the seat is clamped in position by means entirely within the walls of the fitting and of such character as to be easily applied.

Where a flushing valve is lifted from its seat by a metallic stem passing upward through the water in the tank, there is danger of corrosion of this stem, frequently resulting either in breakage or sticking in its guide so that the valve fails to seat. My improved construction avoids this defect, and also insures such proper seating.

In detail, A is the tank having a discharge port in the bottom thereof opening into a channel B formed integral with the tank and leading to the bowl (not shown). C is the annular seat fitting surrounding the port and provided with a suitable gasket D for forming a sealing joint with the bottom of the tank. To secure the seat fitting in position, the tank A is provided with recesses E extending laterally from the channel B and having bolt receiving apertures F extending upward from said recesses through the bottom of the tank. G are bolts engaging ears C' on diametrically opposite sides of the fitting C which pass downward through the apertures F and into the recesses E where they engage nuts or keepers H.

To facilitate the clamping of the fitting in position the nuts or keepers H are guided into proper position in the recesses E by providing the fitting C with downwardly extending ears $C^2$ apertured at $C^3$ for the passage of the members H therethrough. These members H have head portions H' which prevent them from disengaging from the ears $C^2$ and the arrangement is such that when said head H' is pressed against the ear $C^2$ the threaded aperture in the member H will be substantially aligned with the apertures F. Thus by providing the bolts G with tapering ends G' they may be readily engaged with the nut members H and screwed into the same to clamp the fitting C and gasket D against the bottom of the tank.

The flush valve I is a bell shaped hollow member, the stem of which extends upward to a point above the normal water level within the tank. This bell is preferably formed of hard rubber or other comparatively light material. At the upper end there is attached to this bell a loop J for engagement with the lifting lever K. This loop is preferably formed of metal and provided with a threaded shank engaging a correspondingly threaded aperture in the top of the bell. At the lower end of the bell is a cap member L, also preferably formed of hard rubber, to which is secured a gasket M for engaging the valve seat. The cap L has a threaded flange L' engaging corresponding threads in the bell and is further provided with a threaded portion $L^2$ of smaller diameter for receiving a clamping nut N which holds the gasket in position. At the center of the cap is an aperture $L^3$ for the passage of a guide rod O. This guide rod is mounted in a cross bar P in the seat fitting C and extends up to a sufficient height within the bell I to always remain in engagement with the apertured cap.

With the construction as described, in operation the guide O is normally within the bell out of contact with the water so as not to be subjected to corrosion. Also if the bell is formed of non-corrosive material and has its tubular stem extending upward beyond the normal water level corrosion is avoided. When the valve is lifted by the operation of the lever K the cap L will still retain its engagement with the guide O so that upon re-seating, this guide will hold the bell in proper alignment with the seat. All danger of failure to seat is avoided as there is nothing on the guide O to hold the cap from movement thereon and the weight of the bell when out of the water will be sufficient to return it.

What I claim as my invention is:

1. The combination of a tank having a ported bottom with a discharge passage leading from said port integral with said bottom, a recess extending laterally from said passage beneath the bottom, and an aperture through said bottom communicating with said recess, an annular seat fitting surrounding said port provided with a securing ear apertured in alignment with the aperture through said bottom, said fitting also provided with an ear extending downwardly through said port in alignment with said recess, a nut or keeper guided by said downwardly extending ear for insertion into said recess in alignment with the aperture through said bottom and a screw passing through registering apertures in said ear and bottom to engage said nut or keeper and to thereby clamp said fitting to the bottom of the tank.

2. The combination with a tank having a ported bottom, a passageway extending from the port and integral with the bottom, a recess extending laterally from said passageway beneath the bottom and an aperture through the bottom communicating with said recess, an annular seat fitting having a laterally extending ear apertured in alignment with the aperture through said bottom, a downwardly extending ear within said passageway in alignment with said recess, said ear having an aperture therein, a nut or keeper insertable through the aperture in said ear into said recess in registration with the aperture through said bottom, and a screw passing through the aligned apertures in said laterally extending ear and apertured bottom into engagement with said nut or keeper to clamp said fitting to the bottom of the tank.

3. A flushing float valve having an integral hollow stem extending upward above the normal water level and sealed at its upper end and a guide for said valve arranged within said hollow stem.

4. The combination with an annular seat member, of a flushing float valve comprising a bell shaped member provided with a tubular stem extending upward to a height above the normal water level and sealed at its upper end, a cap for closing the lower end of said bell shaped member carrying a gasket for engaging the valve seat, said cap having a central aperture therein and a guide rod secured to said seat extending upward centrally thereof through the aperture in said cap loosely fitting the same and into said hollow stem.

JAMES M. TEAHEN.